Feb. 28, 1933.    R. A. BEEKMAN    1,899,550
POWER SYSTEM
Filed June 23, 1931
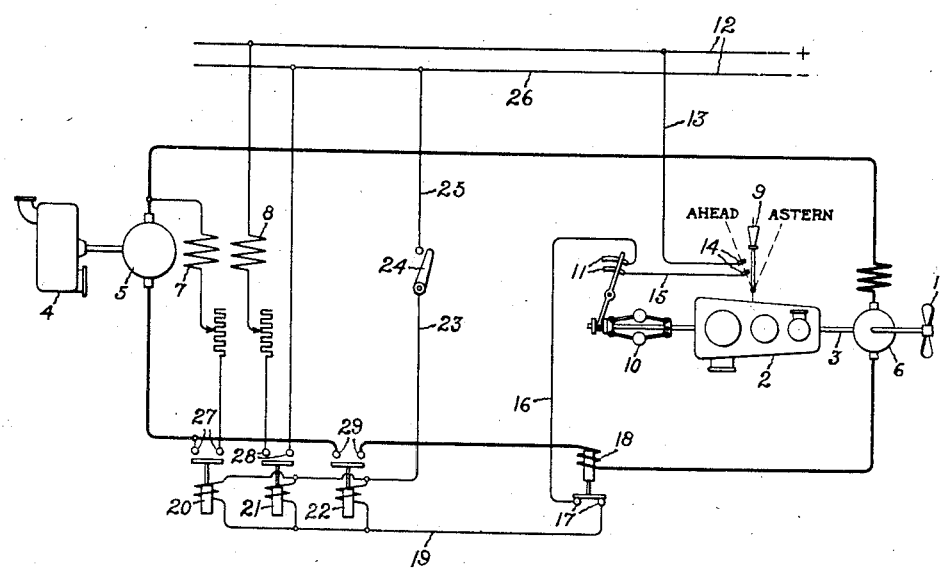
Inventor:
Royce A. Beekman,
by Charles E. Tullar
His Attorney.

Patented Feb. 28, 1933

1,899,550

UNITED STATES PATENT OFFICE

ROYCE A. BEEKMAN, OF SCHENECTADY, NEW YORK, ASSIGNOR TO GENERAL ELECTRIC COMPANY, A CORPORATION OF NEW YORK

POWER SYSTEM

Application filed June 23, 1931. Serial No. 546,327.

My invention relates to power systems employing a plurality of sources of power for driving a common load device.

My invention is particularly applicable to ship propulsion systems in which a ship's propeller is driven by a main prime mover mechanically connected thereto and by an auxiliary prime mover connected thereto through an electrical transmission.

Various types of electrical transmission have been proposed for securing the desired connection of an auxiliary source of power to a propeller driven by a main prime mover. In such systems where the load is continually varying it is difficult properly to govern the main and auxiliary prime movers to prevent an exchange of power between them through the electrical transmission. For example, when the propeller races the main prime mover will normally act to supply energy through the electrical transmission to the auxiliary prime mover and when the propeller load becomes excessive the main prime mover may slow down sufficiently to cause an overload on the auxiliary prime mover.

It is an object of my invention to provide a system in which the exchange of power between the two prime movers is reduced to a minimum and in which the propeller load is proportionately divided between the prime movers supplying power to it.

It is a further object of my invention to provide an improved transmission by means of which the operation of the system is greatly simplified.

My invention will be better understood from the following description taken in connection with the accompanying drawing which shows my invention as applied to a ship propulsion system.

In the arrangement shown in the drawing a ship's propeller 1 is driven by a main prime mover 2 through a shaft 3 to which additional power is supplied from an auxiliary prime mover 4 through an electrical transmission including a generator 5 and a motor 6. A direct current transmission has been employed in the embodiment illustrated, but it is to be understood that my invention is not limited to the employment of direct current apparatus. The generator 5 is driven by the auxiliary prime mover 4 and is electrically connected to the motor 6 which may be either mounted on the shaft 3, as illustrated, or geared thereto. The main prime mover has been illustrated as a reciprocating steam engine and the auxiliary prime mover as a steam turbine. The turbine 4 may receive and be driven by the exhaust from the reciprocating engine 2 although such an arrangement is not necessarily contemplated. Different types of prime movers may be used without departing from my invention.

According to my invention the motor 6 is of the series type. A series motor with its armature rotating in the same direction that it has been rotating during its motoring operation cannot build up as a series generator since as a generator its field is opposed to its residual magnetism and it kills its own voltage. Thus, by employing a series motor there will be no tendency to pump back energy from the main prime mover to the auxiliary prime mover through generator action of the motor 6. Furthermore, by employing a series motor it may be directly connected to its generator without initially paralleling it therewith. The motor, it will be noted, is driven by the main prime mover, and if shunt or separately excited motors were employed it would be necessary to connect them to their generators by paralleling them therewith as generators.

The generator 5 is preferably self-excited with just sufficient separate excitation to insure that it will build up on the low resistance circuit provided by the series motor 6. In the drawing the generator 5 is shown as provided with a self-excited shunt field 7 and a separately excited field 8. When a Diesel engine is used as the auxiliary prime mover 4, this combination of excitation on the generator gives considerable protection for the Diesel engine attached thereto. When the main prime mover 2 slows down due to a heavy load in the seaway, the Diesel electric generator set 4, 5 will naturally try to carry more load. The series characteristics of the motor 6 however will increase its torque, reduce its speed, and thereby reduce the load on the Diesel engine. If, however, the Diesel does slow down under load, the fact that its generator is to a great extent self-excited will further help to protect the engine against overload. In the case of an unloading of the main prime mover and a speeding up of the propeller, as stated previously, there will be no tendency to pump back and the series characteristics of the motor will cause its torque to be reduced and its delivery of power to the propeller to fall off.

The prime mover 2 is provided with a control lever 9 by means of which its direction of rotation is controlled. It may also be provided with an emergency speed governor 10 to protect it from dangerous overspeeds such as may result from loss of propeller, breaking of driving shaft 3, etc. This governer is arranged to operate a switch by means of which at excessive speeds of the prime mover the electrical circuit through contacts 11 associated therewith is interrupted. When the control lever 9 is in the "ahead" position and the prime mover 2 is operating at a normal speed, this lever completes an electrical circuit from bus 12 of an auxiliary source of supply through conductor 13, contacts 14 associated with the control lever 9, conductor 15, contacts 11 of the switch associated with the emergency speed governor 10, conductor 16, contacts 17 of overload relay 18, conductor 19, the operating coils of contactors 20, 21, and 22, conductor 23, switch 24, and conductor 25, to bus 26 of the auxiliary source of supply. Switches 20, 21, and 22 will thus be operated to complete the circuit of the self-excited field 7 at contacts 27, the circuit of the separately-excited field 8 at contacts 28, and the connection of generator 5 to motor 6 at contacts 29. The separately excited field may be connected as illustrated to the same auxiliary source of supply to which the control circuits are connected.

Assuming that the main prime mover 2 is operating at a normal speed with the proper direction of rotation for propelling the ship ahead, the control lever 9 will be in the "ahead" position, completing the electrical circuit through contacts 14 associated therewith and through contacts 11 of the switch associated with the emergency speed governor 10. By closing switch 24 the control circuit above described is completed, energizing switches 20, 21, and 22. Switches 20 and 21 complete the circuits through fields 7 and 8 thereby energizing generator 5, and switch 22 completes the electrical connection between generator 5 and motor 6. The additional power of the generator set 4, 5 will thus be applied to the propeller 1. When the main prime mover slows down due to heavy load the auxiliary prime mover 4 will naturally try to carry more load. The series characteristics of the motor 6 however will increase its torque and decrease its speed thus preventing overloading of the generator 5 and its prime mover 4. Furthermore, if the prime mover 4 slows down due to its increased load, its generator being substantially self-excited will shed part of its load and thus further reduce the power demand on the auxiliary prime mover 4. In the case of underloading of the main prime mover 2 and hence the speeding up of the propeller 1, because of the characteristics of the series motor 6, there will be no tendency to pump energy back from the main prime mover 2 to the auxiliary set 4, 5. It will thus be seen that by employing a series motor 6 overloading of the auxiliary set is reduced and generator action of the motor absolutely prohibited.

In case of a severe overload, the relay 18 will open contacts 17, thus deenergizing switches 20, 21, and 22, which in turn deenergize the generator and open the connection between the generator and the motor. The overload relay 18 should be set quite high so that it will operate only to protect the system from short circuits. Upon operation of the emergency speed governor 10 employed for controlling the main prime mover 2 the control circuit will be interrupted at contacts 11 and the electrical connection between the main and auxiliary sets interrupted through deenergization of the generator 5 and interruption of the power circuit between the generator 5 and the motor 6. In this manner, upon overspeeding of the main prime mover 2, the supply of additional power thereto is interrupted.

Reversing the propeller is accomplished solely by means of the main prime mover 2. When the control lever 9 is moved to the "astern" position the generator 5 is deenergized and its connection with motor 6 interrupted through the opening of the control circuit at contacts 14 which deenergizes switches 20, 21, and 22. The connection between the generator 5 and motor 6 is broken for astern operation of the main prime mover because with reverse rotation it is possible for the series motor 6 to build up as a generator. By removing the field of the generator under such conditions there is no danger of motoring the prime mover 4, and by interrupting the connection between the generator 5 and motor 6 the flow of short circuit current through the generator 5 is prevented.

If the auxiliary prime mover 4 receives and is driven by the exhaust from the main prime mover 2, it may be provided with an emergency speed governor. If it is so provided, the governor should be associated with a switch located in the control circuit in the same manner as the switch associated with the emergency speed governor 10 in the system above described.

It is apparent to those skilled in the art that the proposed arrangement may be modified to meet varying requirements without departing from my invention which has been shown and described in connection with a particular simplified arrangement for the purpose of clearly illustrating the invention, and I therefore aim in the appended claims to cover all such changes and modifications as fall within the true spirit and scope of my invention.

What I claim as new and desire to secure by Letters Patent of the United States is:

1. A power system comprising a prime mover, a load device connected thereto, a series motor connected to said load device, a second prime mover, a generator driven by said second prime mover, and means for electrically connecting said generator and said motor.

2. A power system comprising a main prime mover, a load device subject to wide variations in load connected to said main prime mover, a series motor connected to said load device, an auxiliary prime mover, a generator driven by said auxiliary prime mover, and means for electrically connecting said generator and said motor.

3. A power system comprising a main prime mover, a load device subject to wide variations in load connected to said main prime mover, a series motor connected to said load device, an auxiliary prime mover, a substantially self-excited generator driven by said auxiliary prime mover, and means for electrically connecting said generator and said motor.

4. A power system comprising a prime mover, a load device connected thereto, a series motor connected to said load device, a second prime mover, a generator driven by said second prime mover, means for supplying electrical energy from said generator to said motor, an emergency speed governor for one of said prime movers, and means responsive to said emergency speed governor for interrupting the supply of electrical energy to said motor when the speed of said prime mover exceeds a predetermined value.

5. A power system comprising a reversible main prime mover, a load device connected to said prime mover, a series motor connected to said load device, a second prime mover, a generator driven by said second prime mover, an electrical connection between said generator and said motor, a control lever for said main prime mover, and means responsive to a predetermined position of said control lever for reverse operation of said prime mover for interrupting said electrical connection between said generator and said motor.

6. A power system comprising a reversible load device, means for operating said load device, a series motor connected to said load device, a prime mover, a generator driven by said prime mover, means for electrically connecting said generator to said motor, means for reversing said load device, and means responsive to the operation of said last-mentioned means for interrupting said electrical connection between said generator and said motor.

In witness whereof, I have hereunto set my hand.

ROYCE A. BEEKMAN.